US012812373B2

(12) United States Patent
Yun et al.

(10) Patent No.: US 12,812,373 B2
(45) Date of Patent: Nov. 24, 2026

(54) APPARATUS AND METHOD FOR DRONE CONTROL DATA SECURITY

(71) Applicant: ELECTRONICS AND TELECOMMUNICATIONS RESEARCH INSTITUTE, Daejeon (KR)

(72) Inventors: Joung-Il Yun, Daejeon (KR); Byoung-Koo Kim, Daejeon (KR); Seung-Yong Yoon, Daejeon (KR)

(73) Assignee: ELECTRONICS and TELECOMMUNICATIONS RESEARCH INSTITUTE, Daejeon (KR)

( * ) Notice: Subject to any disclaimer, the term of this patent is extended or adjusted under 35 U.S.C. 154(b) by 222 days.

(21) Appl. No.: 18/769,784

(22) Filed: Jul. 11, 2024

(65) Prior Publication Data

US 2025/0168630 A1 May 22, 2025

(30) Foreign Application Priority Data

Nov. 20, 2023 (KR) ........................ 10-2023-0161569

(51) Int. Cl.
*H04L 9/40* (2022.01)
*H04L 9/08* (2006.01)
*H04W 12/0431* (2021.01)

(52) U.S. Cl.
CPC ....... *H04W 12/0431* (2021.01); *H04L 9/0825* (2013.01)

(58) Field of Classification Search
CPC ................. H04L 9/0825; H04L 9/0618; H04L 2209/84
See application file for complete search history.

(56) References Cited

U.S. PATENT DOCUMENTS

2022/0173908 A1 6/2022 Colacitti et al.

FOREIGN PATENT DOCUMENTS

| | | | |
|---|---|---|---|
| KR | 10-2005-0107535 | A | 11/2005 |
| KR | 10-2019-0051640 | A | 5/2019 |
| KR | 10-2039852 | B1 | 11/2019 |
| KR | 10-2020-0021589 | A | 3/2020 |
| KR | 10-2531876 | B1 | 5/2023 |

OTHER PUBLICATIONS

Dworkin, "Recommendation for Block Cipher Modes of Operation: Galois/Counter Mode (GCM) and GMAC", Nov. 2007, 39 pages (Year: 2007).*
Autosar, "Specification of Secure Onboard Communication Protocol", Nov. 2020, pp. 1-28 (Year: 2020).*

* cited by examiner

*Primary Examiner* — Thaddeus J Plecha
(74) *Attorney, Agent, or Firm* — Sughrue Mion, PLLC

(57) ABSTRACT

Disclosed herein is an apparatus and method for drone control data security. The apparatus includes memory in which at least one program is recorded and a processor for executing the program. The program may encrypt control data in a unit of a block based on a counter block configured using a nonce value and transmit the encrypted control data to a drone along with a nonce change reference counter value, the nonce value initialized to an initial nonce value may change sequentially according to a predetermined sequence each time the control data in a unit of a block is encrypted, and the nonce change reference counter value may increase each time the nonce value changes.

18 Claims, 7 Drawing Sheets

APPARATUS AND METHOD FOR DRONE CONTROL DATA SECURITY

CROSS REFERENCE TO RELATED APPLICATION

This application claims the benefit of Korean Patent Application No. 10-2023-0161569, filed Nov. 20, 2023, which is hereby incorporated by reference in its entirety into this application.

BACKGROUND OF THE INVENTION

1. Technical Field

The disclosed embodiment relates to cryptographic technology for drone control data security.

2. Description of the Related Art

Drones play significant roles across various fields in modern society and are used in various sectors such as industry, military, entertainment, and the like. However, the utilization of drones may involve security threats. Particularly, because control data of a drone definitely affects the operation and safety of the drone, a secure mechanism for protecting the control data from malicious manipulation or hacking is required.

Drones are vulnerable to hacking because they are controlled using wireless communication technology. A drone to which no security technology is applied skips verification when it processes data transmitted and received via a wireless communication channel. Therefore, attackers with malicious intent may hijack or incapacitate the drone by transmitting malfunction signals while disguised as a control device with legitimate control.

Particularly, because drones are flying devices that depend on battery power to operate their motors, when unintended power consumption is caused due to unnecessary actions by receiving incorrect control data from an illegitimate control device, the drones may fail in effectively carrying out their planned mission and achieving their objectives.

SUMMARY OF THE INVENTION

An object of the disclosed embodiment is to enhance the security of operation of a drone by applying energy-efficient low-power security technology while protecting the control of the drone.

An apparatus for drone control data security according to an embodiment includes memory in which at least one program is recorded and a processor for executing the program. The program may encrypt control data in a unit of a block based on a counter block configured using a nonce value and transmit the same to a drone along with a nonce change reference counter value, the nonce value initialized to an initial nonce value may change sequentially according to a predetermined sequence each time the control data is encrypted, and the nonce change reference counter value may increase each time the nonce value changes.

Here, the program may transmit a symmetric key and the initial nonce value that are encrypted with a public key received from the drone to the drone.

Here, the program may receive the public key from the drone through a near-field wireless communication module and transmit the encrypted symmetric key and initial nonce value to the drone.

Here, when it encrypts the control data, the program may encrypt the counter block with a symmetric key and generate an encrypted block by performing an exclusive OR (XOR) operation on the encrypted counter block and a plaintext block, which is the control data in a unit of a block.

Here, when it encrypts the control data, the program may generate an authentication value using the encrypted block and additional authentication data, and the authentication value may be transmitted to the drone along with the control data and the nonce change reference counter value.

An apparatus for drone control data security according to an embodiment includes memory in which at least one program is recorded and a processor for executing the program. The program may decrypt control data encrypted in a unit of a block based on a counter block configured using a nonce value corresponding to a nonce change reference counter value received along with the encrypted control data when it receives the encrypted control data, the nonce value initialized to an initial nonce value may change sequentially according to a predetermined sequence each time the control data is encrypted, and the nonce change reference counter value may increase each time the nonce value changes.

Here, the program may transmit a public key to a drone control device, and when it receives a symmetric key and the initial nonce value that are encrypted with the public key from the drone control device, the program may acquire the symmetric key and the initial nonce value by decrypting the same with a private key.

Here, the program may transmit a public key to a drone control device through a near-field wireless communication module and receive an encrypted symmetric key and initial nonce value from the drone control device.

Here, when it decrypts the control data, the program may encrypt the counter block with a symmetric key and generate a plaintext block by performing an exclusive OR (XOR) operation on the encrypted counter block and an encrypted block, which is the control data in an encrypted block unit.

Here, before it decrypts the control data, the program may determine validity of the received control data based on a difference between a first nonce change reference counter value that is currently received and a second nonce change reference counter value that is received immediately before the first nonce change reference counter value.

Here, when the difference is 0 and nonce change reference counter state information is an initialization completion state, the program may determine that the received control data is first control data received normally.

Here, the program may change the nonce change reference counter state information to a normal reception state, substitute the first nonce change reference counter value for the second nonce change reference counter value, and set the nonce value to a next nonce value in the predetermined sequence.

Here, when the difference is 1 and nonce change reference counter state information is a normal reception state, the program may determine that the received control data is consecutive control data received normally, set the nonce change reference counter state information to a normal reception state, substitute the first nonce change reference counter value for the second nonce change reference counter value, and set the nonce value to a next nonce value in the predetermined sequence.

Here, when the difference is greater than 1 and is equal to or less than a predetermined boundary value, the program may determine that the received control data is control data received after occurrence of a reception error, set nonce change reference counter state information to a normal reception state, substitute the first nonce change reference counter value for the second nonce change reference counter value, and set the nonce value to a nonce value that is distant therefrom by the difference in the predetermined sequence.

Here, when the difference is 0 but nonce change reference counter state information is not an initialization completion state or when the difference is equal to or greater than a predetermined boundary value, the program may discard the received control data.

Here, before it decrypts the control data, the program may generate an authentication value using the encrypted block and additional authentication data and compare the generated authentication value with an authentication value received from a drone control device along with the encrypted control data and the nonce change reference counter value, thereby performing authentication.

A method for drone control data security according to an embodiment includes, when receiving encrypted control data, a nonce change reference counter, and an authentication value, determining validity of the received control data based on a difference between a first nonce change reference counter value that is currently received and a second nonce change reference counter value that is received immediately before the first nonce change reference counter value; when the control data is determined to be valid, performing authentication by comparing the received authentication value with an authentication value generated using the control data in an encrypted block unit and additional authentication data; and when the authentication succeeds, decrypting the control data in an encrypted block unit based on a counter block configured using a nonce value corresponding to the first nonce change reference counter value. The nonce value initialized to an initial nonce value may change sequentially according to a predetermined sequence each time control data is encrypted, and the nonce change reference counter value may increase each time the nonce value changes.

The method for drone control data security according to an embodiment may further include generating a public key and a private key, transmitting the public key to a drone control device, receiving a symmetric key and the initial nonce value that are encrypted with the public key from the drone control device, and decrypting the encrypted symmetric key and initial nonce value with the private key, thereby acquiring the symmetric key and the initial nonce value.

Here, determining the validity may comprise determining that the received control data is first control data received normally when the difference is 0 and nonce change reference counter state information is an initialization completion state, determining that the received control data is consecutive control data received normally when the difference is 1 and the nonce change reference counter state information is a normal reception state, and determining that the received control data is control data received after occurrence of a reception error when the difference is greater than 1 and is equal to or less than a predetermined boundary value.

Here, determining the validity may include setting the nonce change reference counter state information to a normal reception state, substituting the first nonce change reference counter value for the second nonce change reference counter value, and setting the nonce value to a next nonce value in the predetermined sequence.

Here, determining the validity may comprise, when the difference is 0 but nonce change reference counter state information is not an initialization completion state or when the difference is equal to or greater than a predetermined boundary value, discarding the received control data.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
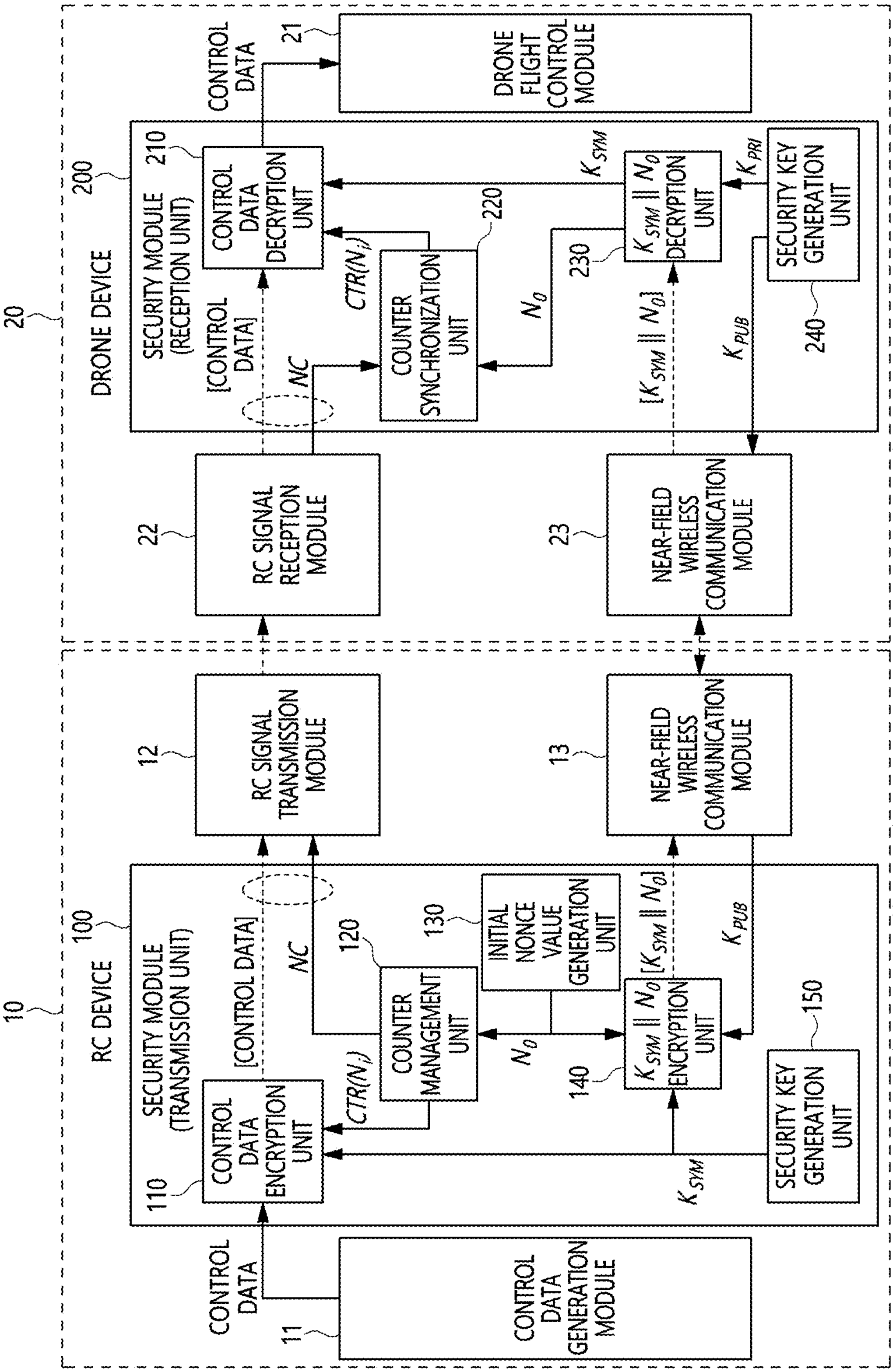
FIG. 1 is a structure diagram of a system for drone control data security according to an embodiment.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Figure 2:
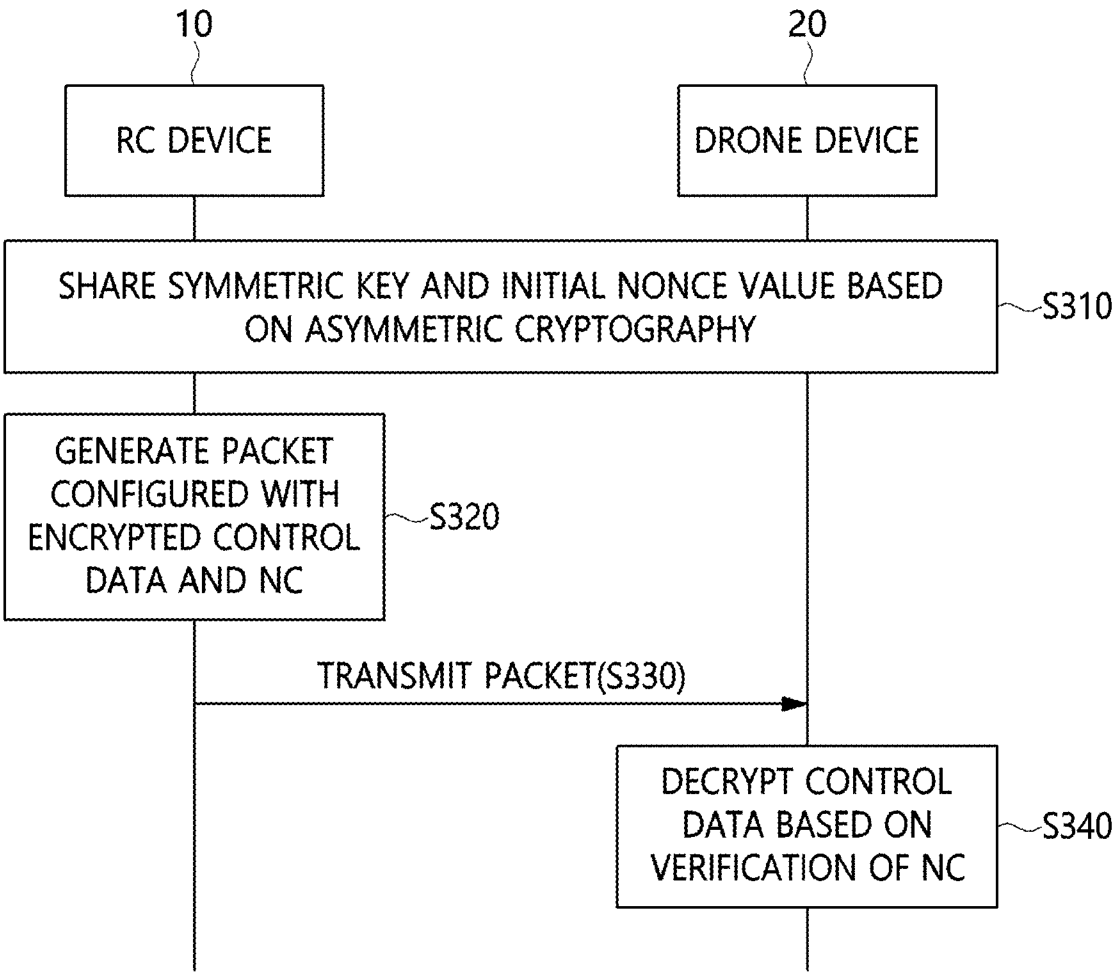
FIG. 2 is a signal flowchart for explaining a method for drone control data security according to an embodiment.

FIG. 1 is a structure diagram of a system for drone control data security according to an embodiment, and FIG. 2 is a signal flowchart for explaining a method for drone control data security according to an embodiment. In FIG. 1, '||' denotes concatenation of data, and '[ ]' denotes encoded data.

Referring to FIG. 1, when a drone device 20 is controlled through an RC device 10, the system for drone control data security according to an embodiment applies security technology that is capable of ensuring stable control by encrypting control data.

Meanwhile, the case in which the drone device 20 is controlled by a ground control station (GCS) through telemetry or telecommands may be a situation that is less sensitive to processing speed (i.e., flight path scheduling, or the like). Accordingly, there may be a difference in processing speed compared to the situation in which the flight operation of the drone device 20 is controlled immediately when a user manipulates the RC device 10. However, the technology for drone control data security according to an embodiment may also be applied when protection of drone control through the GCS is required.

The RC device 10 may include a control data generation module 11, an RC signal transmission module 12, and a near-field wireless communication module 13. Also, the drone device 20 may include a drone flight control module 21, an RC signal reception module 22, and a near-field wireless communication module 23.

According to an embodiment, the control data generation module 11 may transmit control data in the form of a bit sequence of a serial communication method to the drone device 20.

That is, because it is difficult to directly apply a cryptographic algorithm to an analog control signal in the form of Pulse Width Modulation (PWM) or Pulse Position Modulation (PPM), control data in the form of a bit sequence to which a cryptographic algorithm can be applied may be generated.

Therefore, according to an embodiment, the drone flight control module 21 may receive the control data in the form of a bit sequence of a serial communication method and perform drone flight control processing.

Meanwhile, a wireless communication method in which control data transmission using a transmission frame (or packet) based on the standard is processed with low latency may be applied between the RC signal transmission module 12 and the RC signal reception module 22 such that the latency is hardly noticeable during the manipulation of the RC device 10 and such that the drone device 20 is controlled normally. For example, Frequency Hopping Spread Spectrum (FHSS), Long Range (LoRa), LTE, or the like may be applied.

That is, control data may be transmitted in such a way that, when control data having a length equal to or greater than the minimum length is accumulated in a buffer for a time period during which manipulation latency is not noticeable or when transmission does not occur during a time period corresponding to the minimum transmission period, the control data is transmitted if it remains in the buffer.

The near-field wireless communication modules 13 and 23 performing two-way near-field communication may be used for initial binding, such as security key exchange between the RC device 10 and the drone device 20.

Meanwhile, although the RC signal transmission module 12 and the RC signal reception module 22 for processing one-way wireless communication from the RC device 10 to the drone device 20 are illustrated in FIG. 1, the present disclosure is not limited thereto. That is, not a one-way wireless communication module but a two-way wireless communication module may be used in each of the RC device 10 and the drone device 20 in order to transmit control data, in which case the near-field wireless communication modules 13 and 23 for initial binding, such as security key exchange, may not be provided.

Meanwhile, there is a possibility that control data cannot be transmitted/received or an error is caused due to a problem in a wireless communication channel environment between the RC device 10 and the drone device 20. Also, a malicious retransmission attack may occur.

Accordingly, an apparatus for drone control data security is proposed according to an embodiment. The apparatus encrypts control data in order to ensure confidentiality and integrity and verify transmission of control data from a control device with legitimate control, thereby protecting control over a drone.

That is, as illustrated in FIG. 1, security modules 100 and 200 (corresponding to 'apparatuses for drone control data security') are additionally inserted into the RC device 10 and the drone device 20 according to an embodiment, respectively, and the security modules 100 and 200 may process secure transmission/reception of control data for controlling the operation of the drone device 20.

Referring to FIG. 2, based on the security modules 100 and 200 according to an embodiment, the RC device 10 and the drone device 20 may perform the process of sharing a symmetric key $K_{sym}$ and an initial nonce value $N_0$ at step S310, the process of encrypting control data and generating a packet configured with the encrypted control data and a nonce change reference counter (referred to as 'NC' hereinbelow) at step S320, the process of transmitting the generated packet from the RC device 10 to the drone device 20 at step S330, and the process of decrypting valid control data based on verification of the NC at step S340.

The security modules 100 and 200 according to an embodiment may use block cipher, which is a symmetric-key cryptographic technique, as a cryptographic method for control data security.

According to an embodiment, block cipher algorithms, such as Advanced Encryption Standard (AES), Lightweight Encryption Algorithm (LEA), and the like, which can be implemented in a lightweight manner because they have lower complexity than public-key cryptographic techniques, may be applied in mobile devices, such as drones controlled using short control data and operated based on battery power.

Accordingly, in order to apply a block cipher algorithm, which is a symmetric-key cryptographic technique, the symmetric key $K_{sym}$ and the initial nonce value $N_0$ should be shared at step S310 in the process of initial binding between the RC device 10 and the drone device 20 according to an embodiment.

Here, the symmetric key $K_{sym}$ and the initial nonce value $N_0$ may be asymmetrically encrypted and transmitted. Also, the symmetric key $K_{sym}$ and the initial nonce value $N_0$ may be shared by being transmitted and received through the near-field wireless communication modules 13 and 23.

The process of sharing the symmetric key $K_{sym}$ and the initial nonce value $N_0$ will be described later with reference to FIG. 1 and FIG. 3.

Meanwhile, in order to ensure the confidentiality and integrity of the symmetric-key cryptographic algorithm and to verify that control data is transmitted from a control device with legitimate control, an authenticated encryption mode of operation is applied to the security modules 100 and 200 according to an embodiment.

Here, according to an embodiment, authenticated encryption modes of operation, such as Counter with cipher block chaining message authentication code (CBC-MAC) mode (CCM mode) and Galois/Counter Mode (GCM), which are based on a counter (CTR) mode and combines an authenticated mode of operation with the CTR mode, may be applied.

Here, the mode of operation may be applied to encryption and decryption of variable-length data longer than block ciphers for encrypting and decrypting fixed-length block data (e.g., LEA has a fixed 128-bit block data length).

Here, the modes of operation, in which the CTR mode is used as a basic structure, are configured such that counter values increasing in order (referred to as 'counter blocks' hereinbelow) are assigned to a sequence of plaintext data blocks, which are acquired by dividing plaintext data into segments having a basic block size of a block cipher, and an encrypted block is generated by performing an exclusive OR (XOR) operation on the result of encrypting the counter block and the plaintext block. Accordingly, even when the same plaintext is repeatedly encrypted, ciphertexts having the same pattern are not produced if the counter block has a different value. Therefore, parallelization is possible, and there are advantages of rapid processing and high security.

Also, because decryption is possible only when a counter block that is the same as the counter block used in the process of encrypting the plaintext block is applied in the decryption process, the counter block is also used as critical information, like the key.

Also, according to an embodiment, both the security modules 100 and 200 may generate the same counter block for encryption and decryption based on a CTR mode by performing synchronization using a method for referring to a nonce value while securely and privately managing the nonce value in the encryption and decryption processes of the CCM mode and GCM as the encryption and decryption methods suitable for drone control data security.

Here, the Number used ONCE (Nonce) is a unique value that is used only once, and may ensure the uniqueness of data by being used to perform a security function such as integrity verification.

That is, although there is a difference in additional parameters or information used depending on a counter block configuration method defined in the CCM mode and GCM, the nonce is essentially used as an initialization vector (IV) required for generation of a counter block. Accordingly, the nonce protects the integrity of a data block and prevents data tampering, thereby improving the security of the entire system.

The value of the counter block configured using the nonce value in the encryption process should be used in the same manner in the decryption process.

To this end, only the initial nonce value $N_0$ is shared in the process of initial binding between the RC device 10 and the drone device 20 at step S310, after which a counter block is generated such that the nonce value changes according to an agreed-upon method each time encryption or decryption is performed, whereby the encryption and decryption process may be performed.

However, it is highly likely that a signal is not received or an error occurs due to a change in the channel environment in the process of controlling a mobile device such as the drone device 20 in a wireless manner. This may cause a difference between the number of times encryption is performed in the security module 100 and the number of times decryption is performed in the security module 200, and as a result, the change in the nonce value may not be synchronized between the security modules 100 and 200.

Accordingly, the security module 200 is not able to perform decryption normally until the security modules 100 and 200 perform the initialization process.

Alternatively, the security module 100 may directly transmit the nonce value or counter block that was used for encryption to the security module 200 through an RC transmission signal. In this case, the security module 200 may perform decryption normally, but when a malicious attacker captures the wireless signal in the transmission process and analyzes the same, the nonce value, or the like may be exposed, which may result in a problem in which the exposed information is used for a retransmission attack.

Therefore, the transmission security module 100 according to an embodiment may perform the process of encrypting control data and generating a packet configured with the encrypted control data and a nonce change reference counter (referred to as 'NC' hereinbelow) at step S320. That is, the nonce value is securely and privately managed, and the NC, which indirectly provides information about whether the nonce value is changed and the number of times the nonce value is changed, is transmitted along with the encrypted control data at step S330.

Accordingly, the reception security module 200 may decrypt the control data based on the result of verifying the NC of the received packet at step S340.

Here, because the NC is a monotonically increasing counter, it enables the reception security module 200 to determine continuity of control data reception or the possibility of a retransmission attack. That is, when an attacker modifies the NC value and performs a retransmission attack or when the counter value is again initialized and increased from the initial value, the symmetric key and the nonce value do not match the symmetric key and the nonce value that were used for encryption of the control data, and this is determined to be mismatch of authentication values in the authentication process, whereby the attack may be avoided.

The above-described process of encrypting the control data and generating a packet configured with the encrypted control data and the NC at step S320 will be described in detail later with reference to FIG. 1 and FIG. 4, and the process of decrypting valid control data based on verification of the NC at step S340 will be described in detail with reference to FIG. 1, FIG. 5 and FIG. 6.

Figure 3:
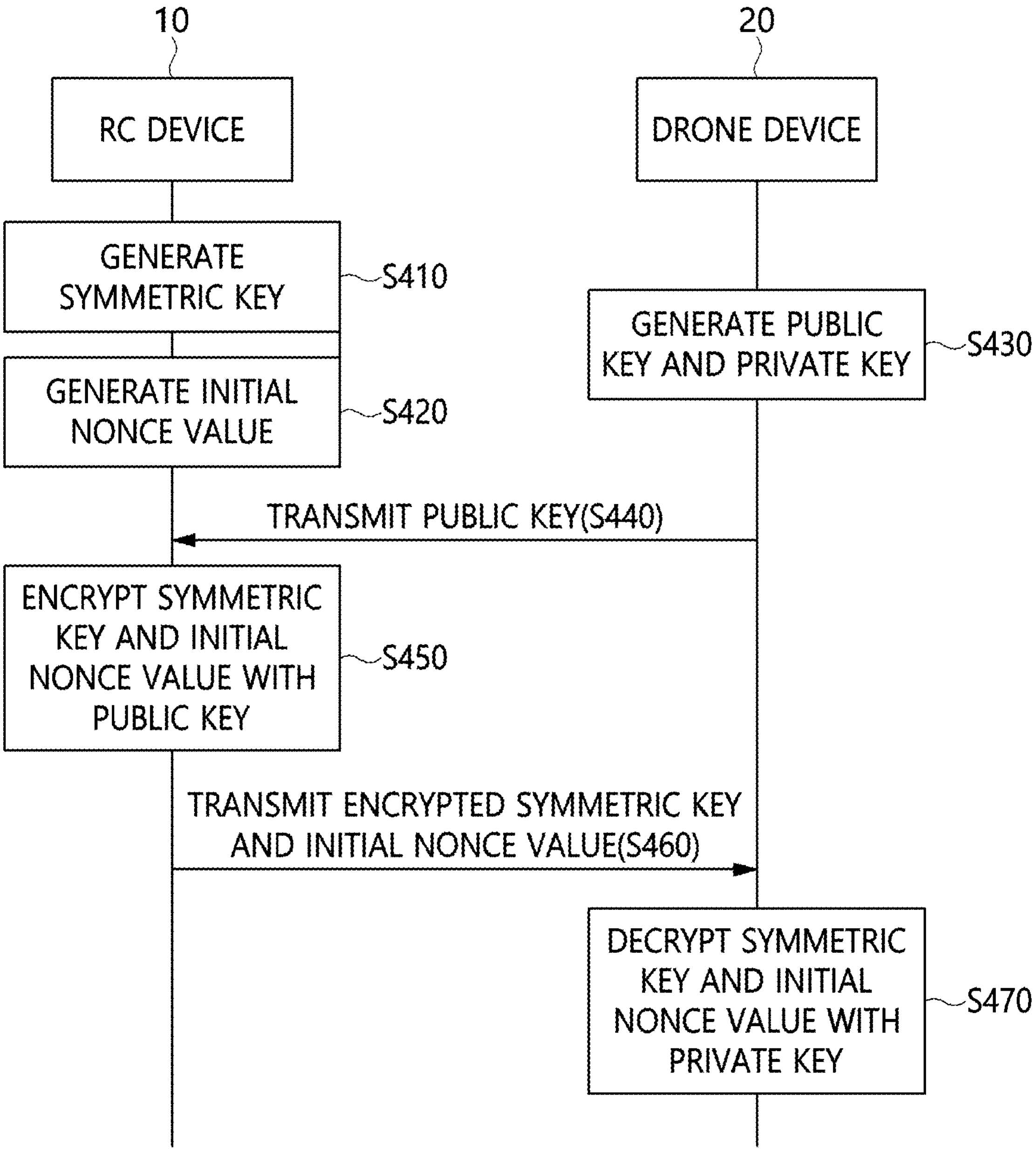
FIG. 3 is a signal flowchart for explaining a process of sharing a symmetric key and an initial nonce value according to an embodiment.

FIG. 3 is a signal flowchart for explaining a process of sharing a symmetric key and an initial nonce value according to an embodiment.

Referring to FIG. 1 and FIG. 3, the security key generation unit 150 of the RC device 10 generates a symmetric key $K_{sym}$ at step S410.

Here, the security key generation unit 150 may generate the security key $K_{sym}$ based on the unique characteristics of the security module 100 of the RC device using Physical Unclonable Function (PUF) technology.

Subsequently, the initial nonce value generation unit 130 of the RC device 10 generates an initial nonce value $N_0$ for generating a counter block at step S420.

Here, the initial nonce value $N_0$ may be generated based on a random number or a drone identifier (ID).

Meanwhile, the security key generation unit 240 of the drone device 20 generates a private key $K_{pri}$ and a public key $K_{pub}$ at step S430.

Here, the security key generation unit 240 may generate the private key $K_{pri}$ and the public key $K_{pub}$ based on the unique characteristics of the security module 200 of the drone device using Physical Unclonable Function (PUF) technology.

Subsequently, the security key generation module 240 transmits the public key $K_{pub}$ to the RC device 10 through the near-field wireless communication module 23.

Accordingly, the $K_{sym}\|N_0$ encryption unit 140 of the RC device 10 encrypts the concatenation of the symmetric key $K_{sym}$ and the initial nonce value $N_0$, that is, $K_{sym}\|N_0$, with the public key $K_{pub}$ at step S450 and transmits the same to the drone device 20 through the near-field wireless communication module 13 at step S460.

Accordingly, the $K_{sym}\|N_0$ decryption unit 230 of the drone device 20 decrypts the symmetric key $K_{sym}$ and the initial nonce value $N_0$ using the private key $K_{pri}$ at step S470.

The decrypted symmetric key $K_{sym}$ is delivered to the control data decryption unit 210, and the initial nonce value $N_0$ is delivered to the counter synchronization unit 220.

Meanwhile, in an embodiment, any of various public-key cryptographic methods may be applied in order to encrypt and decrypt $K_{sym}\|N_0$. However, because the process of encrypting and decrypting $K_{sym}\|N_0$ is performed only once in the binding process for initially connecting the RC device 10 and the drone device 20, a cryptographic algorithm with a superior security level may be used even if it has high complexity. For example, post-quantum cryptography, which is a new public-key cryptography that enables the secure use of cryptography even in a quantum computing environment, may be applied.

When the initial nonce value $N_0$ has been shared as described above, the counter management unit 120 and the counter synchronization unit 220 initialize the NC to a random initial value in the same manner.

Here, the counter synchronization unit 220 may set NC state information, and may store the NC state information as an initialization completion state after the NC is initialized, as described above.

Figure 4:
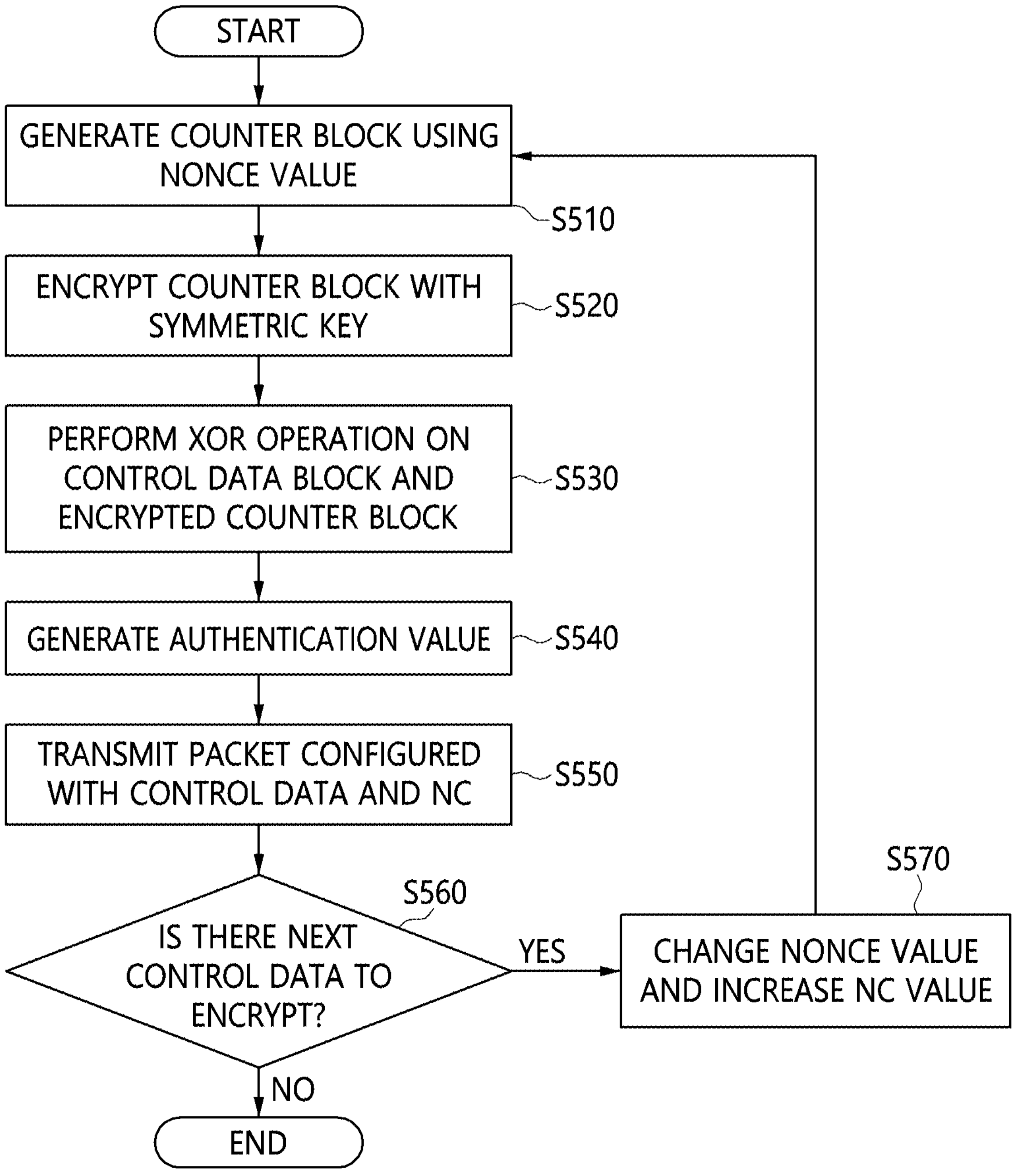
FIG. 4 is a flowchart for explaining a control data encryption step according to an embodiment.

FIG. 4 is a flowchart for explaining a control data encryption step according to an embodiment.

Referring to FIG. 1 and FIG. 4, the counter management unit 120 generates a counter block configured using a nonce value at step S510.

That is, $CTR(N_i)$ output from the counter management unit 120 is a counter block value configured using the nonce $N_i$, and may be the first counter block value used for encryption and decryption of the mode of operation.

Strating from this value, the control data encryption unit 110 generates a sequence of counter blocks increasing according to a sequence of multiple plaintext blocks, which are acquired by dividing the control data into blocks, and in this case, the counter blocks increasing according to the sequence of blocks should also be generated to have a nonce characteristic.

Subsequently, the control data encryption unit 110 encrypts the counter block with the symmetric key $K_{sym}$ at step S520 and generates an encrypted block at step S530 by performing an exclusive OR (XOR) operation on a plaintext block, which is control data in a unit of a block, and the encrypted counter block. That is, the XOR operation is performed on each of the plaintext blocks, acquired by dividing the control data into blocks, and the counter block corresponding thereto.

Subsequently, the control data encryption unit 110 may generate an authentication value using the encrypted block and additional authentication data.

Here, an authentication value T may be generated using the encrypted block and the additional authentication data $A_i$ (additional information optionally used for improving the security strength). For example, the authentication value may be generated using the GHASH function of GCM. In another example, CBC-MAC may be applied.

When encryption using the counter block $CTR(N_i)$ configured using the nonce value $N_i$ is completed in the security module 100, the encrypted control data and the NC value in the current state are mapped as a pair, and the RC signal transmission module 12 configures a transmission frame (or packet) using the pair and transmits the same at step S550. Here, the generated authentication value T may also be transmitted along with the transmission frame.

Subsequently, when the subsequent control data to be encrypted is present at step S560, the counter management unit 120 changes the nonce value and increases the NC value at step S570.

Here, various methods, such as generating a random value, simply increasing or decreasing the value, and the like, may be applied in order to change the nonce value.

However, the sequence for changing the nonce value is preset, and the same sequence should be shared between the transmission/reception security modules 100 and 200.

According to an embodiment, a sequence of nonce values in the form of a lookup table, such as $N_1, N_2, \ldots, N_i, \ldots$, following the initial nonce value $N_0$, may be set in advance and shared.

According to another embodiment, nonce values such as $N_0$, $N_0+1$, $N_0+2$, . . . may also be used.

When the counter management unit 120 changes the nonce value to the next value in the sequence, the NC is increased, as shown in Equation (1) below:

$$NC = NC + 1(\bmod 2^r) \tag{1}$$

In Equation (1), r is the bit length of the NC and is unrelated to the bit length of the nonce value. That is, it may be set greater than the bit length of the nonce value.

Here, when r is large, the length of the NC to be transmitted increases, which lowers transmission efficiency, but a margin for a boundary value (referred to as $NC_T$ hereinbelow) for determining the continuity of signals may be set greater. Conversely, when r is small, the transmission efficiency increases, but the margin for the boundary value decreases, which may result in incorrect determination of the integrity of control data even though it is received normally after unstable signal reception continuing for a long time, and the operation of the system may become unstable.

Accordingly, in the embodiment, a suitable value may be used as r depending on the drone to which r is applied, because r affects the stability of the system and the transmission efficiency. For example, the NC, the length (r) of which is equal to or greater than 16, may be used in consideration of the control data transmission period of common drones.

Figure 5:
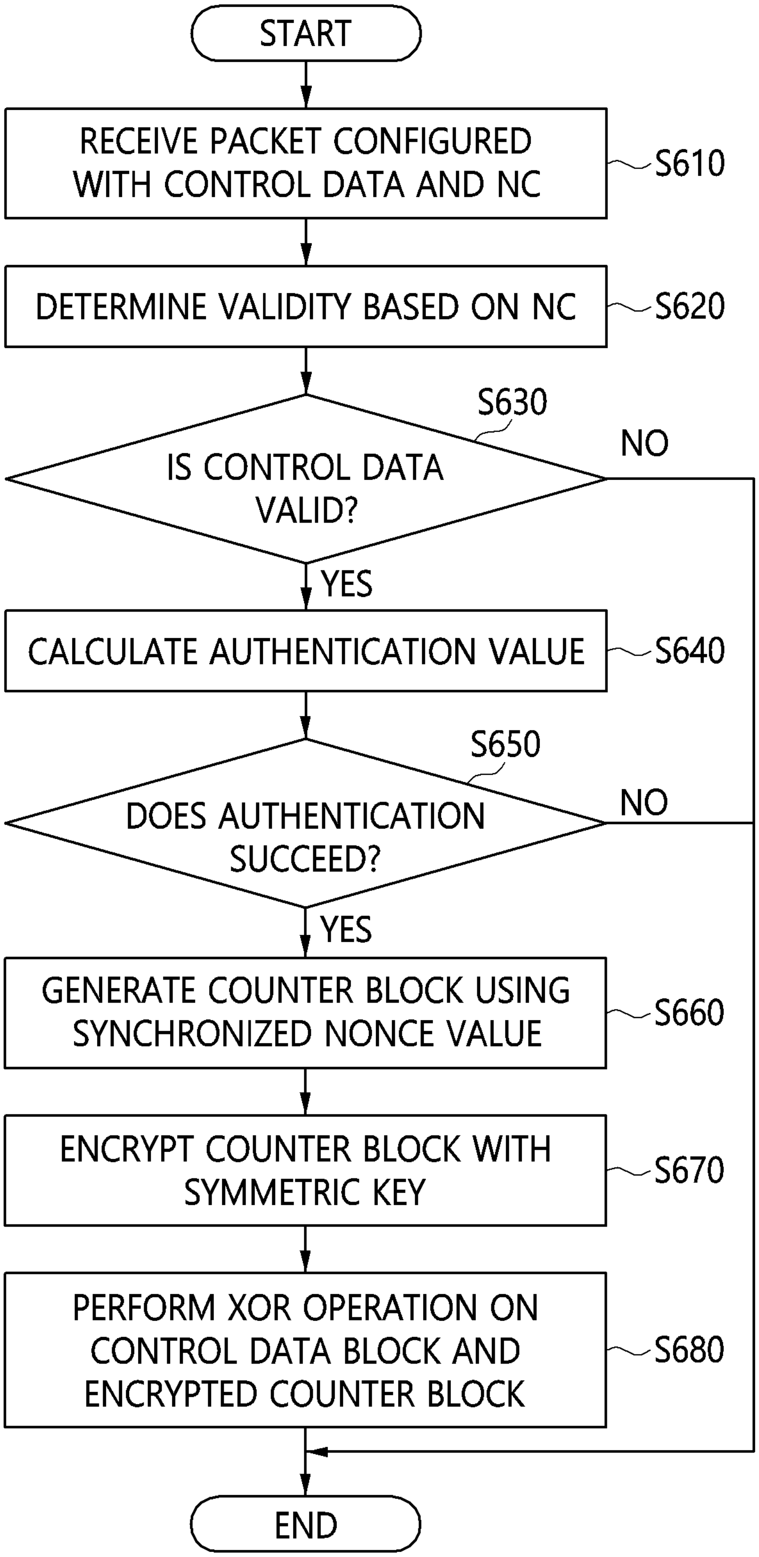
FIG. 5 is a flowchart for explaining a control data decryption step according to an embodiment.

FIG. 5 is a flowchart for explaining a control data decryption step according to an embodiment.

Referring to FIG. 5, when control data in an encrypted block unit and a nonce change reference counter are received at step S610, the control data decryption unit 210 determines the validity of the received control data based on the difference between the first nonce change reference counter value that is currently received and the second nonce change reference counter value that is received immediately before the first nonce change reference counter value, and synchronizes the nonce value at step S620. Determining the validity of the control data at step S620 will be described in detail later with reference to FIG. 6.

When it determines that the control data is valid, the control data decryption unit 210 calculates an authentication value T' using the control data in an encrypted block unit and additional authentication data at step S640. For example, the authentication value may be calculated using the GHASH function of GCM. In another example, CBC-MAC may be applied.

Subsequently, the control data decryption unit 210 performs authentication at step S650 based on whether the calculated authentication value T' is the same as T that is generated when the control data is encrypted.

Here, T may be received along with the control data and the nonce change reference counter at step S610.

That is, when the received control data is determined to be undamaged control data transmitted from a control device with legitimate control by checking whether the authentication values match each other before a plaintext block is restored by decrypting the encrypted block, the process of unnecessarily decrypting data from an unknown source or falsified data can be skipped, whereby power consumption may be reduced.

When authentication succeeds at step S650, the control data decryption unit 210 generates a counter block configured using a nonce value corresponding to the first nonce change reference counter value at step S660.

Subsequently, the control data decryption unit 210 encrypts the counter block with a symmetric key at step S670 and generates a plaintext block by performing an exclusive OR (XOR) operation on the encryption block, which is the control data in an encrypted block unit, and the encrypted counter block at step S680.

Figure 6:
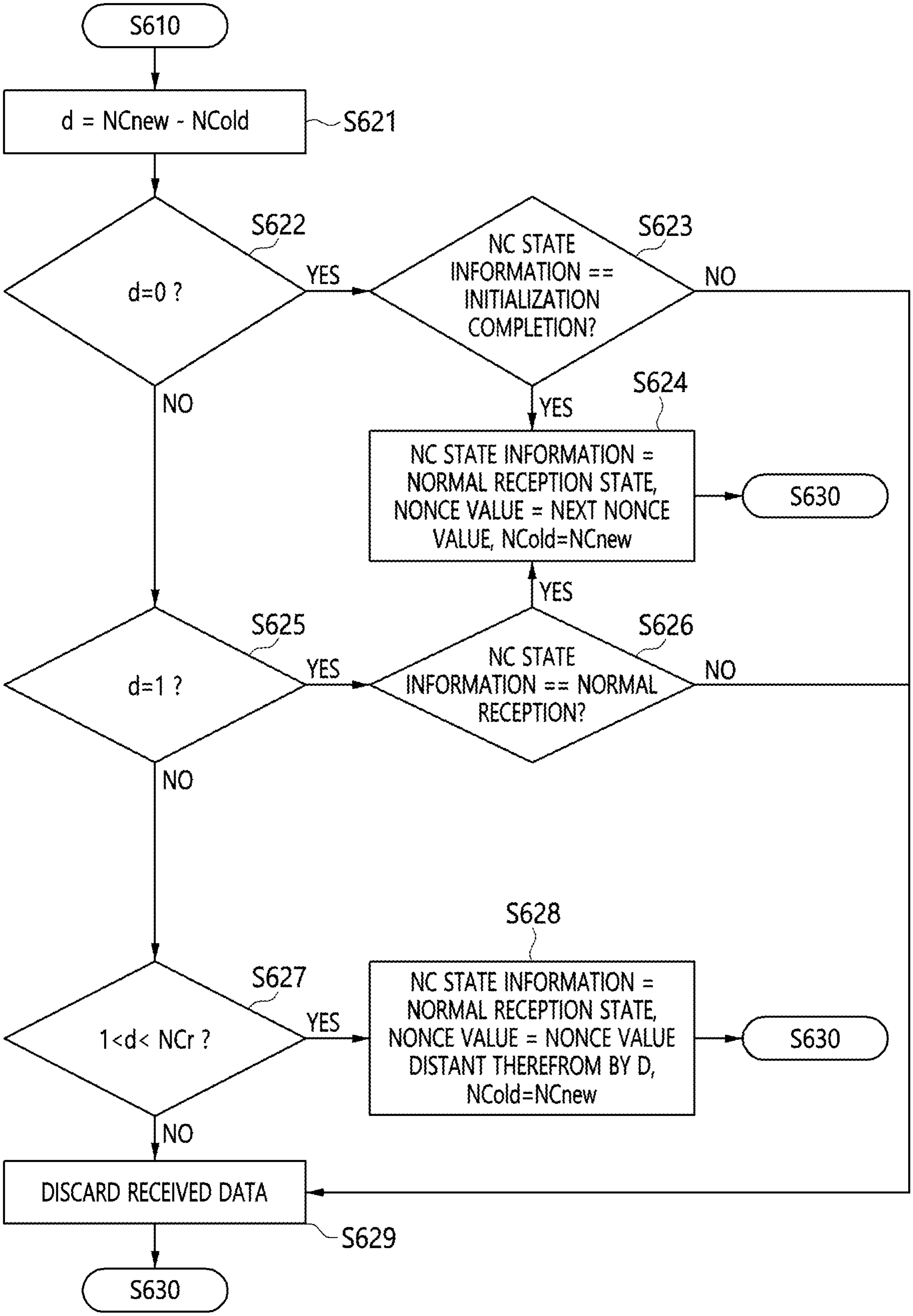
FIG. 6 is a flowchart for explaining a step of determining the validity of control data according to an embodiment.

FIG. 6 is a flowchart for explaining a step of determining the validity of control data according to an embodiment.

Referring to FIG. 6, the control data decryption unit 210 calculates the difference between the current NC value (=$NC_{new}$) received along with encrypted control data and the previous NC value (=$NC_{old}$) stored (or initialized) in the counter synchronization unit 220 at step S621, as shown in Equation (2) below:

$$d = NC_{new} - NC_{old} (\text{mod } 2^r) \quad (2)$$

Subsequently, when d is 0 at step S622 and when the nonce change reference counter state information (NC state information) is an initialization completion state at step S623, the control data decryption unit 210 determines that the control data is first received normally. Accordingly, the control data decryption unit 210 changes the NC state information to a normal reception state, substitutes $NC_{new}$ for $NC_{old}$, and sets the nonce value to the next nonce value in the predetermined sequence at step S624.

When d is 1 at step S625 and when the NC state information is a normal reception state at step S626, the control data decryption unit 210 determines that the received control data is consecutive control data received normally. Accordingly, the control data decryption unit 210 sets the NC state information to a normal reception state, substitutes $NC_{new}$ for $NC_{old}$, and sets the nonce value to the next nonce value in the predetermined sequence at step S624.

When d is greater than 1 and is equal to or less than a preset boundary value $NC_T$ at step S627, the control data decryption unit 210 set the NC state information to a normal reception state and determines that the control data is control data that is received after a temporary problem in RC signal reception or a reception error occurred. Accordingly, the control data decryption unit 210 sets the NC state information to a normal reception state, substitutes $NC_{new}$ for $NC_{old}$, and sets the nonce value to a nonce value that is distant from the current nonce value by the difference in the predetermined sequence at step S628.

Conversely, when d is 0 but the NC state information is not an initialization completion state at step S623, when d is 1 and the NC state information is not a normal reception state at step S626, or when d is greater than $NC_T$ at step S627, the control data decryption unit 210 determines that there is a high possibility of a retransmission attack. Accordingly, the control data decryption unit 210 ignores and discards the received data at step S629.

Meanwhile, although only one boundary value $NC_T$ is used in the embodiment, the present disclosure is not limited thereto. According to another embodiment, a method of dividing a section depending on a probabilistic possibility by applying multiple boundary values and thereby using more diverse conditions for determination may be applied.

Figure 7:
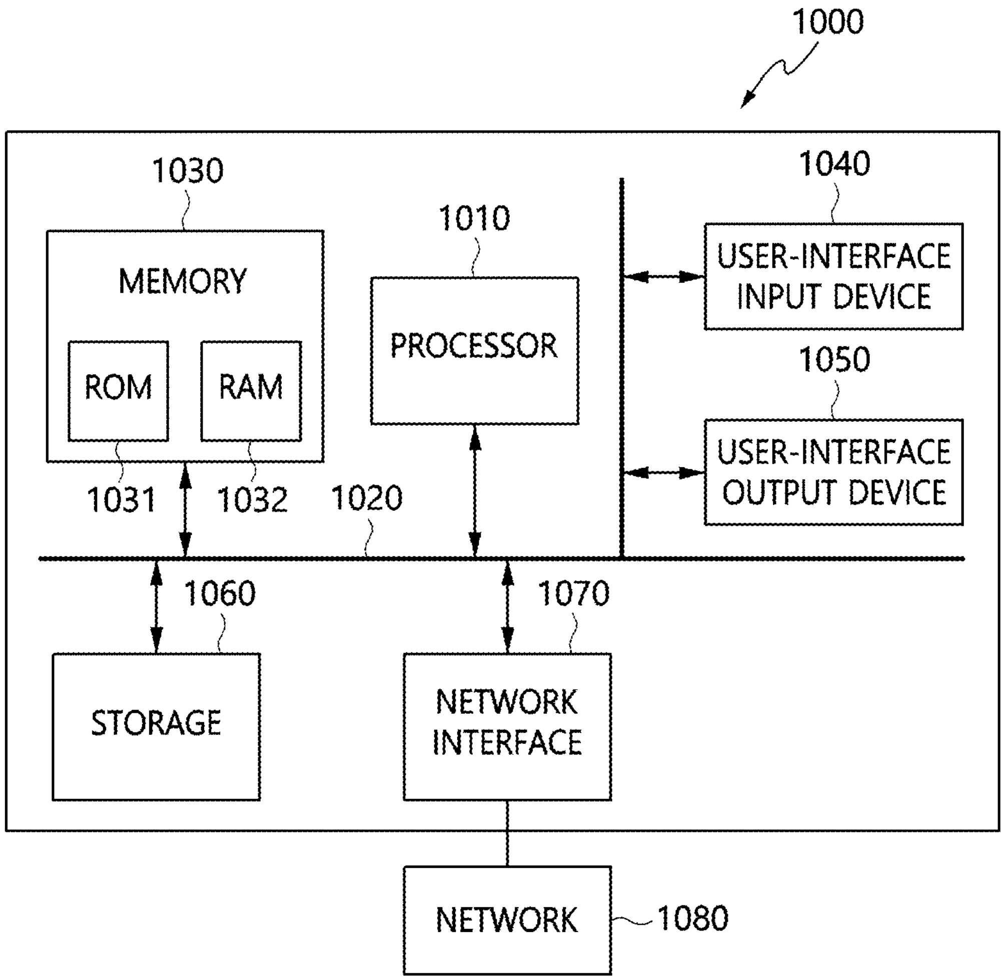
FIG. 7 is a view illustrating a computer system configuration according to an embodiment.

FIG. 7 is a view illustrating a computer system configuration according to an embodiment.

The apparatus for drone control data security according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to the disclosed embodiment, the security of operation of a drone may be enhanced by applying energy-efficient low-power security technology while protecting control of the drone.

According to the disclosed embodiment, the stability of operation of a drone may be improved by ensuring secure transmission and reception of drone control data.

According to the disclosed embodiment, the integrity and security of a drone are enhanced, whereby abnormal manipulation and hijacking may be prevented.

According to the disclosed embodiment, a combination of unique key exchange and a strong cryptographic algorithm is used, whereby hacking by a third party may be prevented.

According to the disclosed embodiment, reliable drone operation is possible through cryptography and an integrity verification process.

Although embodiments of the present disclosure have been described with reference to the accompanying drawings, those skilled in the art will appreciate that the present disclosure may be practiced in other specific forms without changing the technical spirit or essential features of the present disclosure. Therefore, the embodiments described above are illustrative in all aspects and should not be understood as limiting the present disclosure.

What is claimed is:

1. An apparatus for drone control data security, comprising:
memory in which at least one program is recorded; and
a processor for executing the program,
wherein:
the program encrypts control data in a unit of a block based on a counter block configured using a nonce value and transmits the encrypted control data to a drone along with a nonce change reference counter value,
the nonce value initialized to an initial nonce value changes sequentially according to a predetermined sequence each time the control data is encrypted, and
the nonce change reference counter value increases each time the nonce value changes,
wherein the program transmits a symmetric key and the initial nonce value that are encrypted with a public key received from the drone to the drone.

2. The apparatus of claim 1, wherein the program receives the public key from the drone through a near-field wireless communication module and transmits the encrypted symmetric key and initial nonce value to the drone.

3. The apparatus of claim 1, wherein, when encrypting the control data, the program encrypts the counter block with a symmetric key and generates an encrypted block by performing an exclusive OR (XOR) operation on the encrypted counter block and a plaintext block, which is the control data in a unit of a block.

4. The apparatus of claim 3, wherein:
when encrypting the control data, the program generates an authenticating value using the encrypted block and additional authentication data, and
the authentication value is transmitted to the drone along with the control data and the nonce change reference counter value.

5. An apparatus for drone control data security, comprising:
memory in which at least one program is recorded; and
a processor for executing the program,
wherein:
the program decrypts control data encrypted in a unit of a block based on a counter block configured using a nonce value corresponding to a nonce change reference counter value received along with the encrypted control data when receiving the encrypted control data,
the nonce value initialized to an initial nonce value changes sequentially according to a predetermined sequence each time control data is encrypted, and
the nonce change reference counter value increases each time the nonce value changes,
wherein
the program transmits a public key to a drone control device, and
when receiving a symmetric key and the initial nonce value that are encrypted with the public key from the drone control device, the program acquires the symmetric key and the initial nonce value by decrypting the encrypted symmetric key and initial nonce value with a private key.

6. The apparatus of claim 5, wherein the program transmits the public key to the drone control device through a near-field wireless communication module and receives a symmetric key and the initial nonce value that are encrypted from the drone control device.

7. The apparatus of claim 5, wherein, when decrypting the control data, the program encrypts the counter block with a symmetric key and generates a plaintext block by performing an exclusive OR (XOR) operation on the encrypted counter block and an encrypted block, which is the control data in an encrypted block unit.

8. The apparatus of claim 5, wherein, before decrypting the control data, the program determines validity of the received control data based on a difference between a first nonce change reference counter value that is currently received and a second nonce change reference counter value that is received immediately before the first nonce change reference counter value.

9. The apparatus of claim 8, wherein, when the difference is 0 and nonce change reference counter state information is an initialization completion state, the program determines that the received control data is first control data received normally, changes the nonce change reference counter state information to a normal reception state, substitutes the first nonce change reference counter value for the second nonce change reference counter value, and sets the nonce value to a next nonce value in the predetermined sequence.

10. The apparatus of claim 8, wherein, when the difference is 1 and nonce change reference counter state information is a normal reception state, the program determines that the received control data is consecutive control data received normally, sets the nonce change reference counter state information to the normal reception state, substitutes the first nonce change reference counter value for the second nonce change reference counter value, and sets the nonce value to a next nonce value in the predetermined sequence.

11. The apparatus of claim 8, wherein, when the difference is greater than 1 and is equal to or less than a predetermined boundary value, the program determines that the received control data is control data received after occurrence of a reception error, sets nonce change reference counter state information to a normal reception state, substitutes the first nonce change reference counter value for the second nonce change reference counter value, and sets the nonce value to a nonce value corresponding to the difference in the predetermined sequence.

12. The apparatus of claim 8, wherein, when the difference is 0 but nonce change reference counter state information is not an initialization completion state or when the difference is equal to or greater than a predetermined boundary value, the program discards the received control data.

13. The apparatus of claim 7, wherein, before decrypting the control data, the program generates an authentication value using the encrypted block and additional authentication data and compares the generated authentication value with an authentication value received from the drone control device along with the encrypted control data and the nonce change reference counter value, thereby performing authentication.

14. A method for drone control data security, comprising:
when receiving encrypted control data, a first nonce change reference counter value, and an authentication value, determining validity of the received control data based on a difference between the first nonce change reference counter value that is currently received and a second nonce change reference counter value that is received immediately before the first nonce change reference counter value;
when the control data is determined to be valid, performing authentication by comparing the received authentication value with an authentication value generated using the control data in an encrypted block unit and additional authentication data; and when the authentication succeeds, decrypting the control data in the encrypted block unit based on a counter block configured using a nonce value corresponding to the first nonce change reference counter value, wherein:

the nonce value initialized to an initial nonce value changes sequentially according to a predetermined sequence each time control data is encrypted, and a nonce change reference counter value increases each time the nonce value changes.

15. The method of claim 14, further comprising:

generating a public key and a private key;

transmitting the public key to a drone control device;

receiving a symmetric key and the initial nonce value that are encrypted with the public key from the drone control device; and decrypting the encrypted symmetric key and initial nonce value with the private key, thereby acquiring the symmetric key and the initial nonce value.

16. The method of claim 14, wherein determining the validity comprises determining that the received control data is first control data received normally when the difference is 0 and nonce change reference counter state information is an initialization completion state, determining that the received control data is consecutive control data received normally when the difference is 1 and the nonce change reference counter state information is a normal reception state, and determining that the received control data is control data received after occurrence of a reception error when the difference is greater than 1 and is equal to or less than a predetermined boundary value.

17. The method of claim 16, wherein determining the validity includes setting the nonce change reference counter state information to the normal reception state, substituting the first nonce change reference counter value for the second nonce change reference counter value, and setting the nonce value to a next nonce value in the predetermined sequence.

18. The method of claim 14, wherein determining the validity comprises, when the difference is 0 but nonce change reference counter state information is not an initialization completion state or when the difference is equal to or greater than a predetermined boundary value, discarding the received control data.

* * * * *